(12) United States Patent
Heishi et al.

(10) Patent No.: US 6,366,035 B1
(45) Date of Patent: Apr. 2, 2002

(54) CRT DISPLAY APPARATUS

(75) Inventors: Akinori Heishi; Hironobu Yasui, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/775,633

(22) Filed: Feb. 5, 2001

(30) Foreign Application Priority Data

Sep. 11, 2000 (JP) .......................................... 12-274354

(51) Int. Cl.[7] ................................................. G09G 1/04

(52) U.S. Cl. ...................... 315/387; 315/30; 315/388; 315/389

(58) Field of Search .................................. 315/387, 388, 315/389, 390, 30, 3, 14, 15, 16

(56) References Cited

U.S. PATENT DOCUMENTS

| 5,430,596 A | * | 7/1995 | Hamaguchi et al. ............ 361/86 |
| 5,523,657 A | * | 6/1996 | Kamei .................... 315/368.18 |
| 6,060,845 A | * | 5/2000 | Tsukahara et al. ........... 315/370 |
| 6,100,630 A | * | 8/2000 | Amano et al. ............... 313/414 |

FOREIGN PATENT DOCUMENTS

JP            11-224618           8/1999

* cited by examiner

Primary Examiner—Don Wong
Assistant Examiner—Tuyet T. Vo

(57) ABSTRACT

A CRT display apparatus is disclosed. The CRT display apparatus includes a CRT having an electron gun whose electrodes for controlling an electron beam are applied with voltages from their respective voltage sources specifically designed to supply an electrode current, and is capable of automatically ceasing a discharge that has occurred under fault conditions between any electrode within the electron gun and the cathode or an anode of the CRT.

8 Claims, 8 Drawing Sheets

CRT DISPLAY APPARATUS

FIELD OF THE INVENTION

The present invention relates to a CRT display apparatus including a CRT, to be more specific, relates to a CRT display apparatus including a CRT having an electron gun whose electrodes for controlling an electron beam are applied with voltages from their respective voltage sources specifically designed to supply an electrode current.

BACKGROUND OF THE INVENTION

FIG. 8 shows the structure of a display apparatus disclosed in Japanese Unexamined Patent Publication No. 11-224618 as an example of a CRT display apparatus including a CRT having such an electron gun. This apparatus features a CRT of high intensity and high resolution called "Hi-Gm tube" that has an electron gun within which an additional electrode called "Gm electrode" is disposed between a G2 electrode and a G3 electrode for modulating an electron beam.

In the figure, there is shown a CRT 1, an anode 2, a flyback transformer 3, and a secondary coil 4 disposed within the flyback transformer 3. The secondary coil 4 is connected to the anode 2 of the CRT 1 through a high-tension line 5. Reference numeral 6 denotes a high-impedance resistor disposed within the flyback transformer 3, one end of which is connected to the secondary coil 4 and the other end of which is connected to one end of a variable resistor 7 for a G3 electrode 11. The other end of the variable resistor 7 is connected to one end of a high-tension detecting resistor 10 disposed outside the flyback transformer 3, and a slidable terminal of the variable resistor 7 is connected to the G3 electrode 11. The node of the variable resistor 7 and the high-tension detecting resistor 10 makes a high-tension level feedback point 9. A voltage at the high-tension level feedback point 9 is supplied to a high-tension control circuit 22. Reference numeral 12 denotes a Gm electrode, and this Gm electrode 12 is applied with a voltage from a Gm electrode voltage source 17. Reference numeral 13 denotes a G2 electrode, and this G2 electrode 13 is applied with a voltage from a G2 electrode voltage source 16. Reference numeral 14 denotes a G1 electrode, and 15 denotes a cathode. Reference numeral 18 denotes a current source for supplying a current of an electron beam (referred to as "beam current" hereinafter) to the anode 2. Reference numeral 20 denotes a primary coil of the flyback transformer 3, one end of which is connected to the high-tension control circuit 22 and the other end of which is connected to a power supply circuit 23 supplying power for producing the high-tension. In FIG. 8, the structure of the electron gun is the same as that of the conventional electron gun for the part following the G3 electrode, and therefore, that part is omitted from the drawing to simplify explanation.

In the display apparatus described above, currents in proportion to the beam current flowing from the cathode to the screen flow through the G2 electrode 13 and the Gm electrode 12 peculiar to the Hi-Gm tube respectively. Therefore, in order to make the voltage drops as small as possible, the voltages to be applied to these electrodes are supplied from the voltage sources 16 and 17 of low output impedance respectively. In FIG. 8, the G2 electrode 13 is applied with about 500V and the Gm electrode 12 is applied with about 80V. When the potential of the cathode 15 is lower than the potential of the Gm electrode 12, electrons pass through the Gm electrode 12 and flow to the screen. The slope of the potential after the Gm electrode 12 is of the order of $10^6$ (V/m). Compared with the potential slope between the cathode 15 and the G1 electrode 14, it is greater by an order of magnitude. Accordingly, after electrons pass through the Gm electrode 12, most of them can move towards the screen without being affected by spatial charges.

For this reason, variation in the intensity of the electron beam in the Hi-Gm tube when the cathode potential is varied by a certain value is about twice as much as that in the conventional CRT. That is, the variation of the cathode potential required to vary the intensity of the electron beam by a certain value is less than half the variation required in the conventional CRT. In other words, with the Hi-Gm tube, the variation in the intensity of the electron beam can be doubled for the same variation of the cathode potential. Consequently, with the Hi-Gm tube, it is possible to easily adapt to video signals of high frequency, and therefore to easily provide a display apparatus of high intensity and high resolution.

As the voltage of the cathode 15 decreases, the beam current increases and brightness of the screen goes up. At this time, the currents flowing through the Gm electrode 12 and the G2 electrode 13 increase in proportion to the beam current. The anode 2 is applied with the voltage stepped up to about 25 KV by the flyback transformer 3, and the beam current is supplied from the beam current source 18 connected to the secondary coil 4. The high-tension of about 25 KV applied to the anode 2 is divided by the high-impedance resistor 6 (about 100 MΩ), the variable resistor 7 and the high-tension detecting resistor 10, to produce a voltage of about 7 KV at the slidable terminal of the variable resistor 7. This voltage is supplied to the G3 electrode 11 functioning to converge the beam current. Since almost no current flows through the G3 electrode 11, there occurs no voltage drop. Accordingly, the voltage applied to the G3 electrode 11 does not fluctuate. The voltage at the high-tension level feedback point 9 is input to the high-tension control circuit 22. The high-tension control circuit 22 controls a switching frequency or duty ratio of the voltage applied to the primary coil 20 such that the optimum voltage of about 25KV always appears along the high-tension line 5.

OBJECT AND SUMMARY OF THE INVENTION

In the display apparatus described above, if sparking occurs between the anode 2 and the G3 electrode 11, since the potential of the G3 electrode 11 goes up, a discharge occurs between the G3 electrode 11 and the Gm electrode 12 or the G2 electrode 13. Furthermore, a discharge between the G3 electrode 11 and the cathode 15 can occur through the Gm electrode and the G2 electrode. Subsequently, a current starts to flow through the G3 electrode 11, whereby the potential of the G3 electrode 11 falls due to a voltage drop caused by the current flowing through the high-impedance resistor 6. If the potential of the G3 electrode 11 falls, since the effect of converging the beam current is weakened, the beam current directly hits the G3 electrode 11, and consequently, the current flowing to the screen is interrupted and the screen is blanked out. At this time, since the voltage at the high-tension level feedback point 9 as well falls, the high-tension control circuit 22 operates to raise the voltage of the high-tension line 5, whereby the voltage of the high-tension line 5 goes up to an extraordinary value. As a result of the rise of the high-tension line 5, the voltage of the G3 electrode 11 does not go down completely, and therefore the abnormal discharge continues. In such a state, each electrode within the electron gun is applied with an uncontrollable high voltage continuously, and extraordinary electrode currents flow, so the apparatus cannot recover from the state in which the screen remains blanked out. As a result, the performance characteristics of the electron gun is deteriorated. Such a dangerous state can occur also in a case where an initial sparking has occurred between the G3 electrode 11 and the Gm electrode 12 or G2 electrode 13 due to impurities etc. If this state in which the high-tension has been raised continues further, not only the CRT but also other electric components within the apparatus can undergo large stress.

An object of the present invention is to provide a display apparatus, which includes a CRT having an electron gun whose electrodes for controlling an electron beam are applied with voltages from their respective voltage sources specifically designed to supply an electrode current, and is capable of automatically ceasing a discharge that has occurred between any electrode within the electron gun and the cathode or the anode of the CRT.

This object is achieved by a CRT display apparatus comprising:

a CRT having an electron gun;
said electron gun including:
a cathode;
a G1 electrode, a G2 electrode, and a G3 electrode disposed in that order for drawing electrons from said cathode; and
a modulating Gm electrode disposed between said G2 electrode and said G3 electrode,
a transformer producing a high tension to be applied to an anode of said CRT at a secondary coil thereof;
a voltage-dividing resistor dividing said high-tension to produce a voltage to be applied to said G3 electrode;
a voltage generator generating a voltage having a value depending on a current flowing into said dividing resistor as a feedback voltage;
a high-tension control circuit for controlling, on the basis of said feedback voltage, a voltage at a primary coil of said transformer so as to keep said high-tension at a predetermined value;
a G2 electrode voltage source for outputting a predetermined voltage to be applied to said G2 electrode;
a Gm electrode voltage source for outputting a predetermined voltage to be applied to said Gm electrode; and
a comparator for comparing said feedback voltage with one of an output voltage of said Gm electrode voltage source and an output voltage of said G2 electrode voltage source, said comparator supplying a detection signal to said high-tension control circuit upon detecting that only said feedback voltage has fallen from a normal value,
said high-tension control circuit controlling said voltage at said primary coil of said transformer so as to lower said high-tension in response to said detection signal.

This object is achieved also by a CRT display apparatus comprising:

a CRT having an electron gun;
said electron gun including:
a cathode; and
a G1 electrode, a G2 electrode, and a G3 electrode disposed in that order for drawing electrons from said cathode,
a transformer producing a high tension to be applied to an anode of said CRT at a secondary coil thereof;
a voltage-dividing resistor dividing said high-tension to produce a voltage to be applied to said G3 electrode;
a voltage generator generating a voltage having a value depending on a current flowing into said dividing resistor as a feedback voltage;

a high-tension control circuit for controlling, on the basis of said feedback voltage, a voltage at a primary coil of said transformer so as to keep said high-tension at a predetermined value;
a G2 electrode voltage source for outputting a predetermined voltage to be applied to said G2 electrode; and
a comparator for comparing said feedback voltage with an output voltage of said G2 electrode voltage source, said comparator supplying a detection signal to said high-tension control circuit upon detecting that only said feedback voltage has fallen from a normal value,
said high-tension control circuit controlling said voltage at said primary coil of said transformer so as to lower said high-tension in response to said detection signal.

This object is achieved also by a CRT display apparatus comprising:

a CRT having an electron gun;
said electron gun including:
a cathode;
a G1 electrode, a G2 electrode, and a G3 electrode disposed in that order for drawing electrons from said cathode; and
a modulating Gm electrode disposed between said G2 electrode and said G3 electrode,
a transformer producing a high tension to be applied to an anode of said CRT at a secondary coil thereof;
a voltage-dividing resistor dividing said high-tension to produce a voltage to be applied to said G3 electrode;
a first voltage generator generating a voltage having a value depending on a current flowing into said dividing resistor as a feedback voltage;
a high-tension control circuit for controlling, on the basis of said feedback voltage, a voltage at a primary coil of said transformer so as to keep said high-tension at a predetermined value;
a G2 electrode voltage source for outputting a predetermined voltage to be applied to said G2 electrode;
a Gm electrode voltage source for outputting a predetermined voltage to be applied to said Gm electrode;
a second voltage generator for outputting a voltage of a value equal to a value of said feedback voltage when said CRT display apparatus is operating normally; and
a comparator for comparing said feedback voltage with an output voltage of said second voltage generator, said comparator supplying a detection signal to said high-tension control circuit upon detecting that only said feedback voltage has fallen from a normal value,
said high-tension control circuit controlling said voltage at said primary coil of said transformer so as to lower said high-tension in response to said detection signal.

This object is achieved also by a CRT display apparatus comprising:

a CRT having an electron gun,
said electron gun including:
a cathode;
a G1 electrode, a G2 electrode, and a G3 electrode disposed in that order for drawing electrons from said cathode; and
a modulating Gm electrode disposed between said G2 electrode and said G3 electrode,
a transformer producing a high tension to be applied to an anode of said CRT at a secondary coil thereof;
a first voltage-dividing resistor dividing said high-tension to produce a voltage to be applied to said G3 electrode;

a second voltage-dividing resistor connected in series to said first voltage-dividing resistor to produce a screen bias voltage used to adjust a black level of a screen of said CRT;

a voltage generator generating a voltage having a value depending on a current flowing into said first and second voltage-dividing resistors as a feedback voltage;

a high-tension control circuit for controlling, on the basis of said feedback voltage, a voltage at said primary coil of said transformer so as to keep said high-tension at a predetermined value;

a G2 electrode voltage source for outputting a predetermined voltage to be applied to said G2 electrode;

a Gm electrode voltage source for outputting a predetermined voltage to be applied to said Gm electrode; and a comparator for comparing said screen bias voltage with one of an output voltage of said Gm electrode voltage source and an output voltage of said G2 electrode voltage source, said comparator supplying a detection signal to said high-tension control circuit upon detecting that only said screen bias voltage has fallen from a normal value, said high-tension control circuit controlling said voltage at said primary coil of said transformer so as to lower said high-tension in response to said detection signal.

In any of the CRT display apparatuses described above, the comparator may be provided with a timer circuit to enable the high-tension control circuit to lower the high-tension over a predetermined period of time preset in the timer circuit, and thereafter return the high-tension to a normal value.

BRIEF DESCRIPTION OF THE DRAWINGS

Embodiments of the invention will now be described by way of example and with reference to the accompanying drawings in which.

DESCRIPTION OF THE PREFERRED EMBODIMENTS

Figure 1:
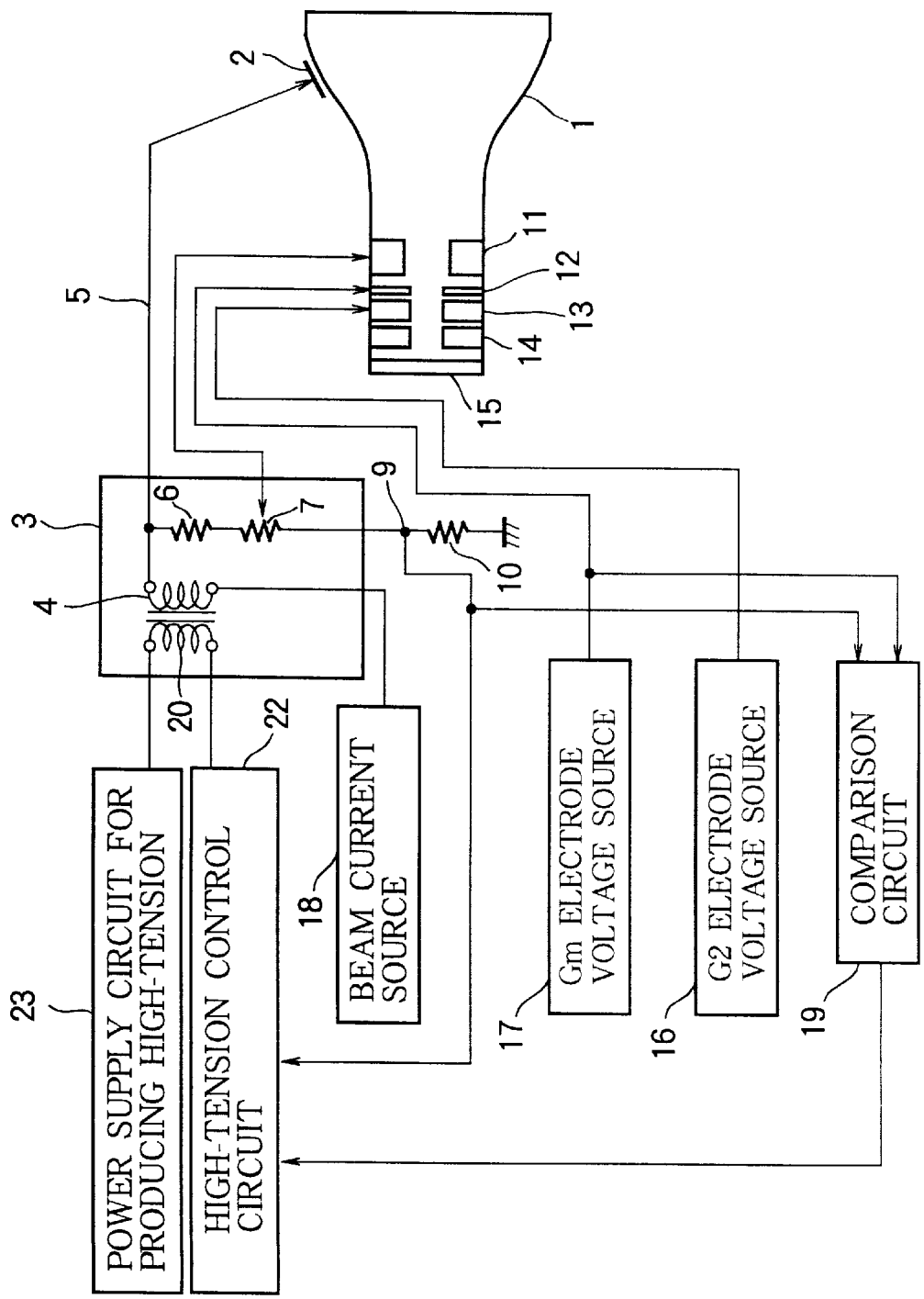
FIG. 1 is a block diagram showing a structure of a first example of the CRT display apparatus according to the invention.
Figure 8:
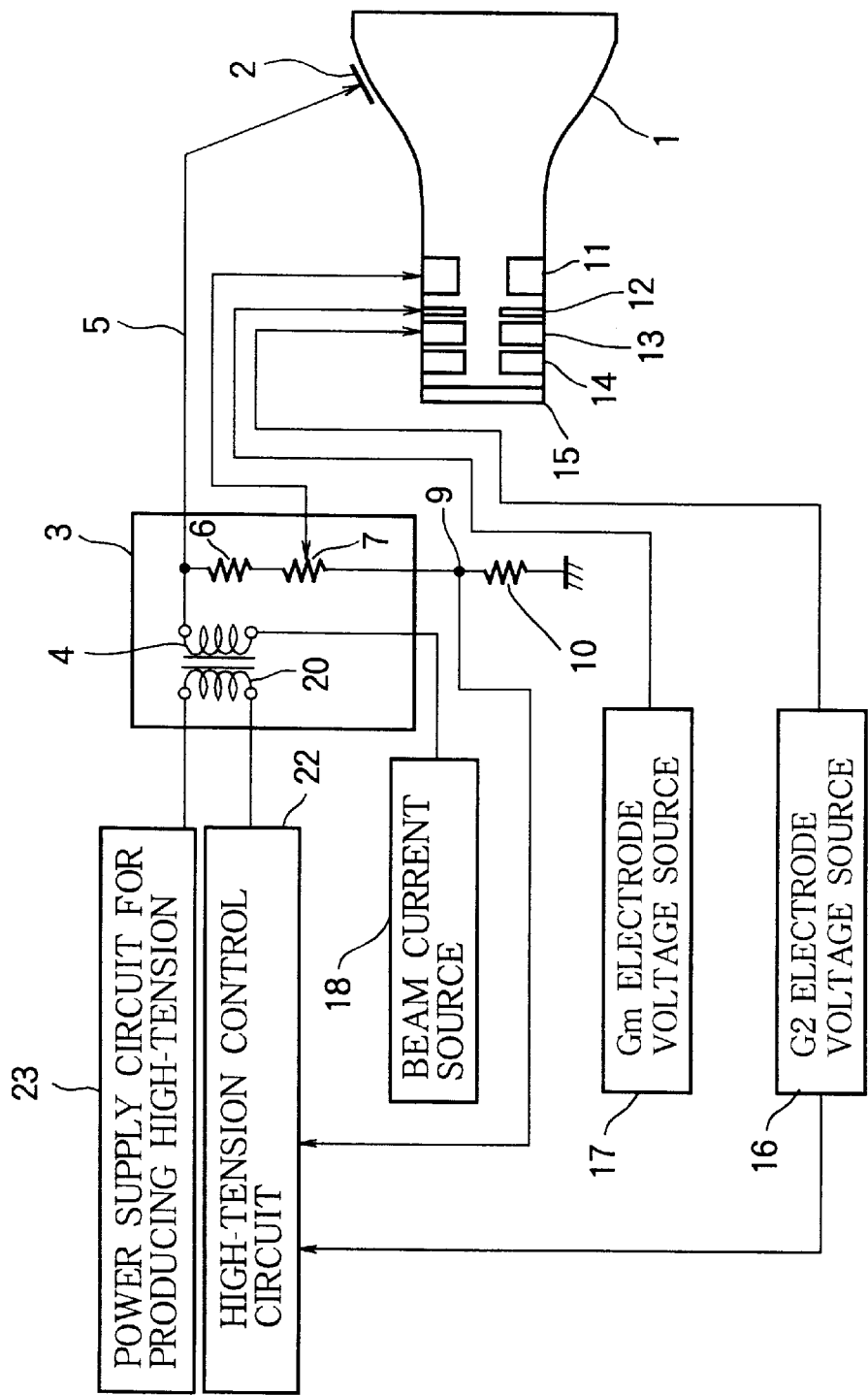
FIG. 8 is a block diagram showing a structure of a conventional CRT display apparatus.

FIG. 1 is a block diagram showing a structure of a first example of the CRT display apparatus according to the invention. In FIG. 1, reference numerals identical to those in FIG. 8 represent the same elements. In the figure, there is shown a CRT 1, an anode 2, a flyback transformer 3, and a secondary coil 4 disposed within the flyback transformer 3. The secondary coil 4 is connected to the anode 2 through a high-tension line 5. Reference numeral 6 denotes a high-impedance resistor disposed within the flyback transformer 3, one end of which is connected to the secondary coil 4 and the other end of which is connected to one end of a variable resistor 7 for a G3 electrode 11. The other end of the variable resistor 7 is connected to one end of a high-tension detecting resistor 10 disposed outside the flyback transformer 3, and a slidable terminal of the variable resistor 7 is connected to the G3 electrode 11. The node of the variable resistor 7 and the high-tension detecting resistor 10 makes a high-tension level feedback point 9. A voltage at this high-tension level feedback point 9 is supplied to a high-tension control circuit 22. Reference numeral 12 denotes a Gm electrode, and this Gm electrode 12 is applied with a voltage from a Gm electrode voltage source 17. Reference numeral 13 denotes a G2 electrode, and this G2 electrode 13 is applied with a voltage from a G2 electrode voltage source 16. Reference numeral 14 denotes a G1 electrode, and 15 denotes a cathode. Reference numeral 18 denotes a current source supplying a beam current to the anode 2. Reference numeral 20 denotes a primary coil of the flyback transformer 3, one end of which is connected to the high-tension control circuit 22 and the other end of which is connected to a power supply circuit 23 supplying power for producing the high-tension.

The apparatus of FIG. 1 further includes a comparison circuit 19 that compares the voltage at the high-tension level feedback point 9 with the output voltage of the Gm electrode voltage source 17. The output of the comparison circuit 19 is input into the high-tension control circuit 22. In FIG. 1, the structure of the electron gun is the same as that of the conventional electron gun for the part following the G3 electrode, and therefore, that part is omitted from the drawing to simplify explanation.

The operation of the apparatus of the first example will be explained below. The anode 2 is applied with the voltage stepped up to about 25 KV by the flyback transformer 3, and the beam current is supplied from the beam current source 18 connected to the secondary coil 4. The high-tension of about 25 KV applied to the anode 2 is divided by the high-impedance resistor 6 (about 100 MΩ), the variable resistor 7 and the high-tension detecting resistor 10, to produce a voltage of about 7 KV at the slidable terminal of the variable resistor 7. This voltage is supplied to the G3 electrode 11 functioning to converge the beam current. Since almost no current flows through the G3 electrode 11, there occurs no voltage drop. Accordingly, the voltage applied to the G3 electrode 11 does not fluctuate. The voltage at the high-tension level feedback point 9 is input to the high-tension control circuit 22. The high-tension control circuit 22 controls a switching frequency or duty ratio of the voltage applied to the primary coil 20 such that the optimum voltage of about 25 KV always appears along the high-tension line 5.

On the other hand, the voltage at the high-tension level feedback point 9 and the output voltage of the Gm electrode voltage source 17 are also input into the comparison circuit 19. In a case where, although the output voltage of the Gm electrode voltage source is at a normal value, only the voltage at the high-tension level feedback point 9 falls from its normal value, the comparison circuit 19 determines that a discharge has occurred between any electrode within the electron gun and the anode or the cathode, and delivers a signal indicative of occurrence of the discharge. In response to this signal, the high-tension control circuit 22 reduces the effective value of the voltage applied to the primary coil 20 by controlling the switching frequency or duty ratio of this voltage. Thus, the voltage of the high-tension line 5 and the voltage applied to the G3 electrode 11 go down, and the discharge ceases. It is also possible to make a microcomputer (not shown) performing other functions of the display apparatus carry out the function of this comparison circuit 19.

Figure 2:
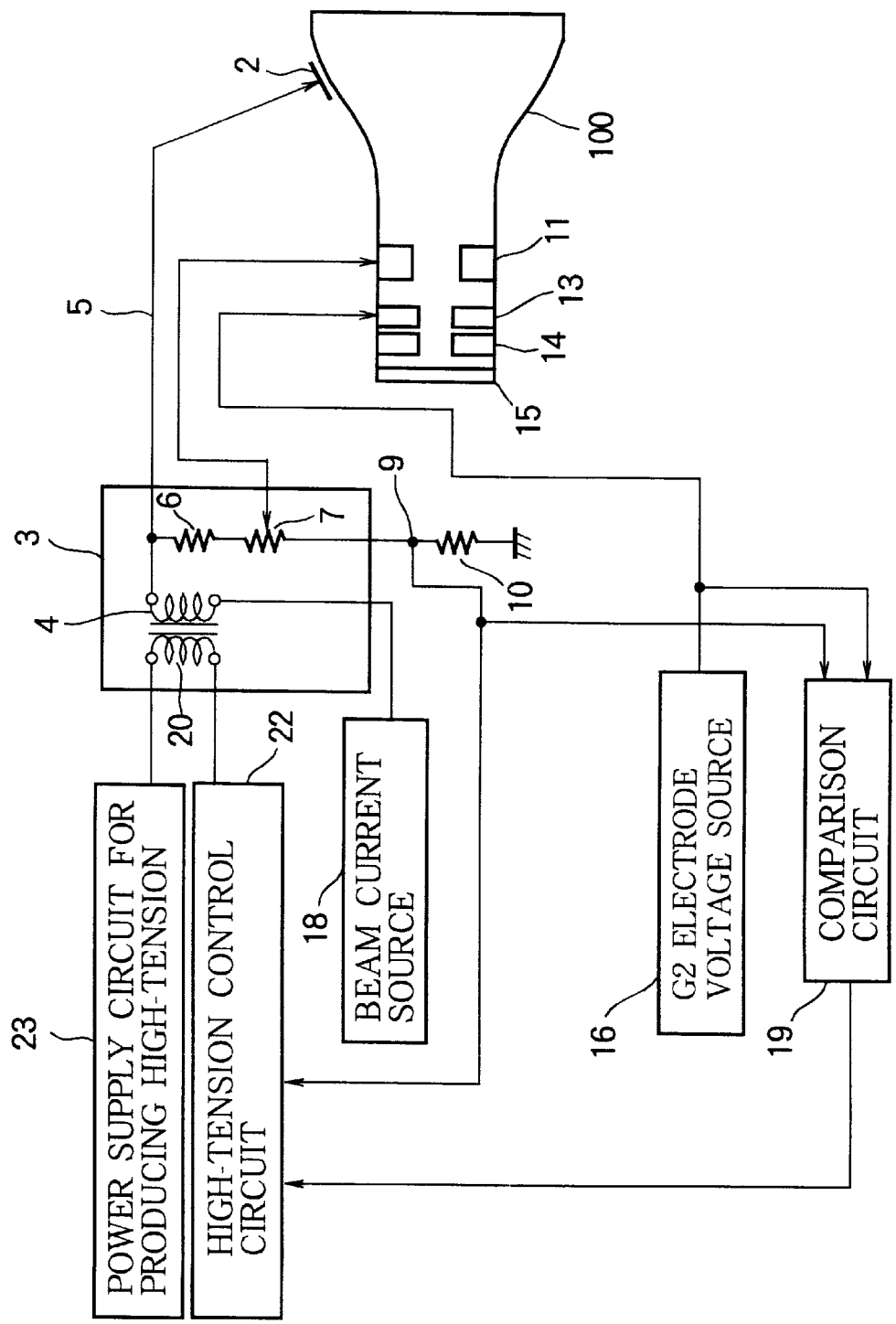
FIG. 2 is a block diagram showing a structure of a second example of the CRT display apparatus according to the invention.

FIG. 2 is a block diagram showing a structure of a second example of the CRT display apparatus according to the invention. In FIG. 2, the elements that are the same as those in FIG. 1 are given the same reference numerals, and explanation thereof will be omitted. The apparatus of the second example uses a conventional CRT 100 instead of the Hi-Gm tube 1, and therefore, the Gm electrode voltage source 17 used in the first example is not provided.

The operation of the apparatus of the second example will be explained below. The anode 2 is applied with the voltage stepped up to about 25 KV by the flyback transformer 3, and the beam current is supplied from the beam current source 18 connected to the secondary coil 4. The high-tension of about 25 KV applied to the anode 2 is divided by the high-impedance resistor 6 (about 100 MΩ), the variable resistor 7 and the high-tension detecting resistor 10, to produce a voltage of about 7 KV at the slidable terminal of the variable resistor 7. This voltage is supplied to the G3 electrode 11 functioning to converge the beam current. Since almost no current flows through the G3 electrode 11, there occurs no voltage drop. Accordingly, the voltage applied to the G3 electrode 11 does not fluctuate. The voltage at the high-tension level feedback point 9 is input to the high-tension control circuit 22. The high-tension control circuit 22 controls a switching frequency or duty ratio of the voltage applied to the primary coil 20 such that the optimum voltage of about 25 KV always appears along the high-tension line 5.

In the second example, the voltage at the high-tension level feedback point 9 and the output voltage of the G2 electrode voltage source 16 are input into the comparison circuit 19. In a case where, although the output voltage of the G2 electrode voltage source is at a normal value, only the voltage at the high-tension level feedback point 9 falls from its normal value, the comparison circuit 19 determines that a discharge has occurred between any electrode within the electron gun and the anode or the cathode, and delivers a signal indicative of occurrence of the discharge. In response to this signal, the high-tension control circuit 22 reduces the effective value of the voltage applied to the primary coil 20 by controlling the switching frequency or duty ratio of this voltage. Thus, the voltage of the high-tension line 5 and the voltage applied to the G3 electrode 11 go down, and the discharge ceases. It is also possible to make a microcomputer (not shown) performing other functions of the display apparatus carry out the function of this comparison circuit 19.

Figure 3:
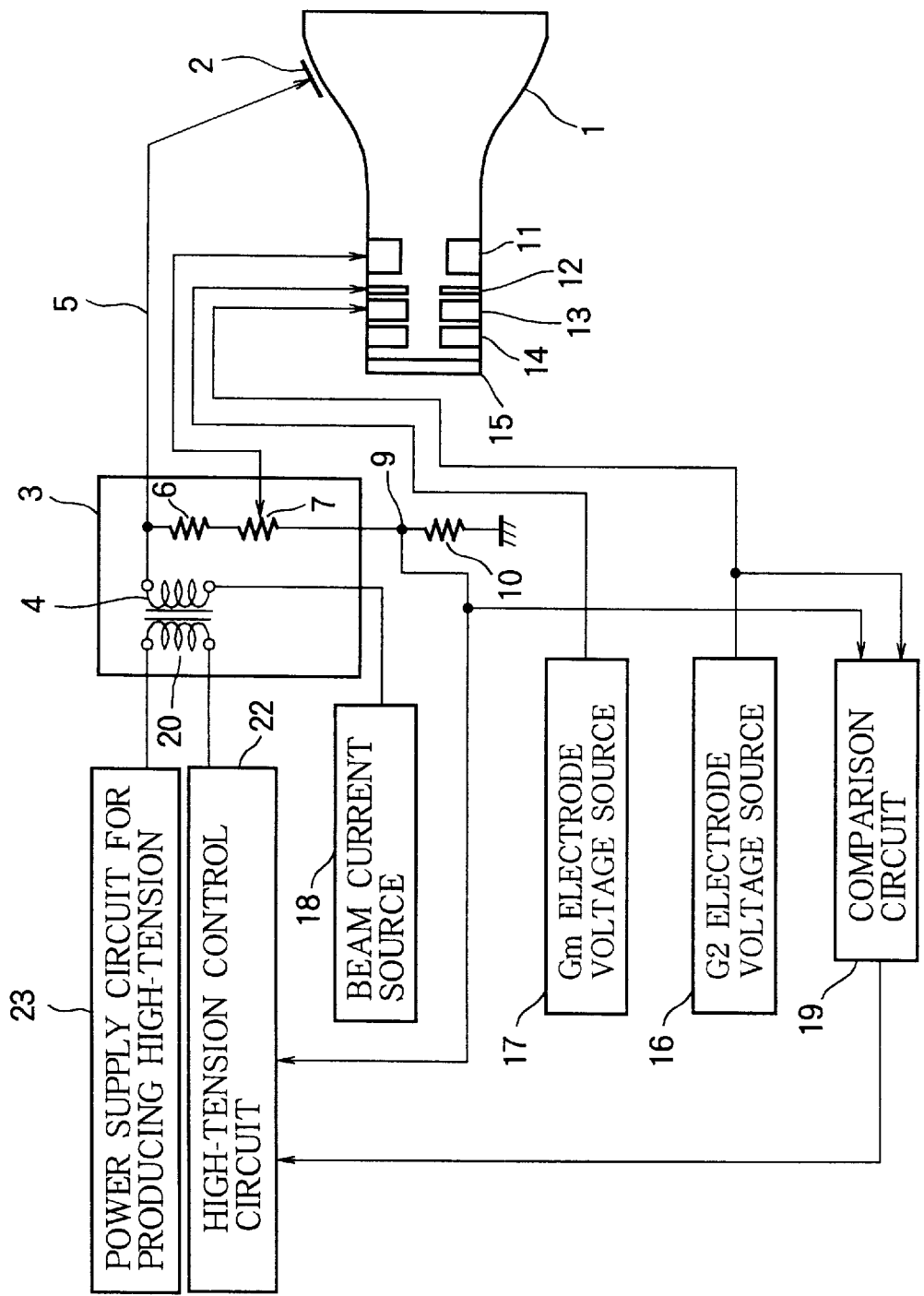
FIG. 3 is a block diagram showing a structure of a third example of the CRT display apparatus according to the invention.

FIG. 3 is a block diagram showing a structure of a third example of the CRT display apparatus according to the invention. In FIG. 3, the elements that are the same as those in FIG. 1 are given the same reference numerals, and explanation thereof will be omitted. The third example differs from the first example in that the comparison circuit 19 is supplied with the output voltage of the G2 electrode voltage source 16 instead of the output voltage of the Gm electrode voltage source 17. That is, in the third example, the voltage at the high-tension level feedback point 9 and the output voltage of the G2 electrode voltage source 16 are input into the comparison circuit 19. In a case where, although the output voltage of the G2 electrode voltage source is at a normal value, only the voltage at the high-tension level feedback point 9 falls from its normal value, the comparison circuit 19 determines that a discharge has occurred between any electrode within the electron gun and the anode or the cathode, and delivers a signal indicative of occurrence of the discharge. In response to this signal, the high-tension control circuit 22 reduces the effective value of the voltage applied to the primary coil 20 by controlling the switching frequency or duty ratio of this voltage. Thus, the voltage of the high-tension line 5 and the voltage applied to the G3 electrode 11 go down, and the discharge ceases. It is also possible to make a microcomputer (not shown) performing other functions of the display apparatus carry out the function of the comparison circuit 19.

Figure 4:
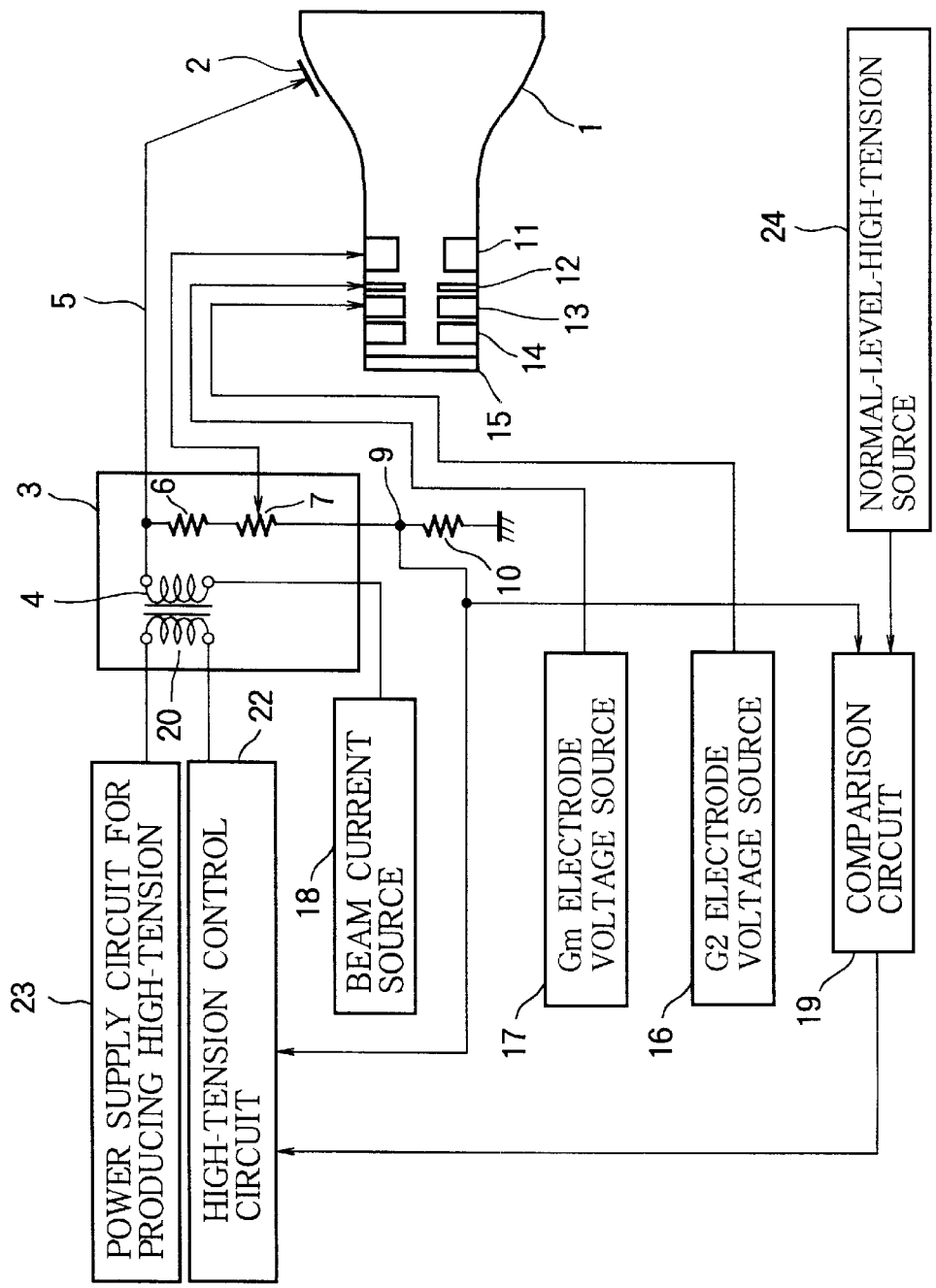
FIG. 4 is a block diagram showing a structure of a fourth example of the CRT display apparatus according to the invention.

FIG. 4 is a block diagram showing a structure of a fourth example of the CRT display apparatus according to the invention. In FIG. 4, the elements that are the same as those in FIG. 1 are given the same reference numerals, and explanation thereof will be omitted. The apparatus of the fourth example has a normal-level-high-tension source 24 which generates a voltage equivalent to the voltage at the high-tension level feedback point 9 when there is no discharge occurring between any electrode within the electron gun and the anode or the cathode, and the apparatus is functioning normally.

The operation of the apparatus of the fourth example will be explained below. The anode 2 is applied with the voltage stepped up to about 25 KV by the flyback transformer 3, and the beam current is supplied from the beam current source 18 connected to the secondary coil 4. The high-tension of about 25 KV applied to the anode 2 is divided by the high-impedance resistor 6 (about 100 MΩ), the variable resistor 7 and the high-tension detecting resistor 10, to produce a voltage of about 7 KV at the slidable terminal of the variable resistor 7. This voltage is supplied to the G3 electrode 11 functioning to converge the beam current. Since almost no current flows through the G3 electrode 11, there occurs no voltage drop. Accordingly, the voltage applied to the G3 electrode 11 does not fluctuate. The voltage at the high-tension level feedback point 9 is input to the high-tension control circuit 22. The high-tension control circuit 22 controls a switching frequency or duty ratio of the voltage applied to the primary coil 20 such that the optimum voltage of about 25 KV always appears along the high-tension line 5. In the fourth example, the voltage at the high-tension level feedback point 9 and the output voltage of the normal-level-high-tension source 24 are input into the comparison circuit 19. In a case where, although the output voltage of the normal-level-high-tension source 24 is at a normal value, only the voltage at the high-tension level feedback point 9 falls from its normal value, the comparison circuit 19 determines that a discharge has occurred between any electrode within the electron gun and the anode or the cathode, and delivers a signal indicative of occurrence of the discharge. In response to this signal, the high-tension control circuit 22 reduces the effective value of the voltage applied to the primary coil 20 by controlling the switching frequency or duty ratio of this voltage. Thus, the voltage of the high-tension line 5 and the voltage applied to the G3 electrode 11 go down, and the discharge ceases. It is also possible to make a microcomputer (not shown) performing other functions of the display apparatus carry out the function of this comparison circuit 19.

Figure 5:
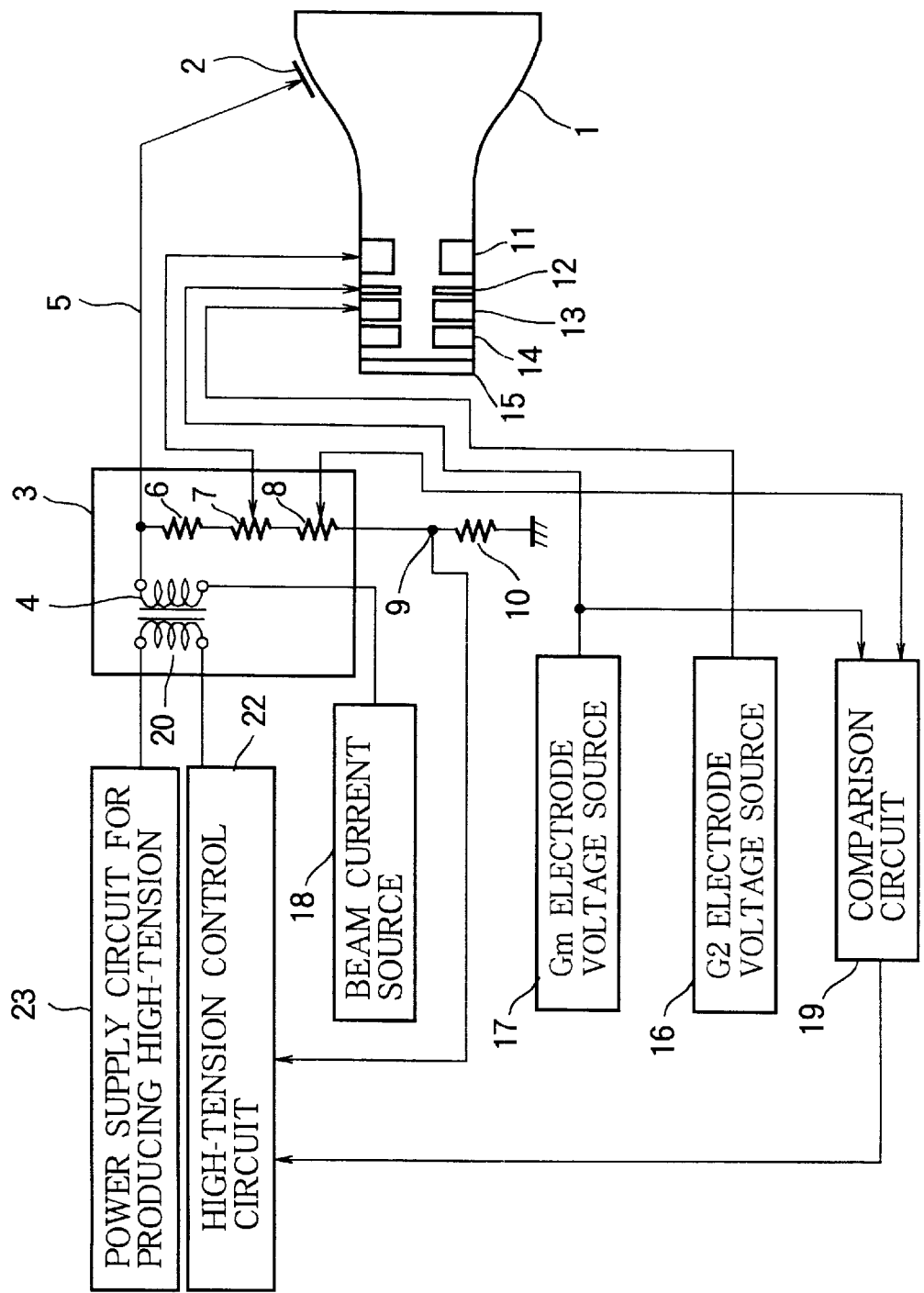
FIG. 5 is a block diagram showing a structure of a fifth example of the CRT display apparatus according to the invention.

FIG. 5 is a block diagram showing a structure of a fifth example of the CRT display apparatus according to the invention. In FIG. 5, the elements that are the same as those in FIG. 1 are given the same reference numerals, and explanation thereof will be omitted. Generally, a flyback transformer for a CRT includes a variable resistor used for producing a screen bias voltage which is applied to a G2 electrode to adjust a black level of the CRT. The fifth example utilize the screen bias voltage produced by this variable resistor for detecting occurrence of a discharge between any electrode within the electron gun and the anode or the cathode. In FIG. 5, a variable resistor 8 for producing the screen bias voltage is connected between the variable resistor 7 for the G3 electrode and the high-tension detecting resistor 10. The screen bias voltage obtained at the slidable terminal of the variable resistor 8 is supplied to the comparison circuit 19.

The operation of the apparatus of the fifth example will be explained below. The anode 2 is applied with the voltage stepped up to about 25 KV by the flyback transformer 3, and the beam current is supplied from the beam current source 18 connected to the secondary coil 4. The high-tension of about 25 KV applied to the anode 2 is divided by the high-impedance resistor 6 (about 100 MΩ), the variable resistor 7 and the high-tension detecting resistor 10, to produce a voltage of about 7 KV at the slidable terminal of the variable resistor 7. This voltage is supplied to the G3 electrode 11 functioning to converge the beam current. Since almost no current flows through the G3 electrode 11 as long as there is no discharge occurring between any electrode within the electron gun and the anode or the cathode, there occurs no voltage drop. Accordingly, the voltage applied to the G3 electrode 11 does not fluctuate, and the voltage obtained at the slidable terminal of the variable resistor 8 connected to the variable resistor 7 in series does not fluctuate as well. The voltage at the high-tension level feedback point 9 is input to the high-tension control circuit 22. The high-tension control circuit 22 controls a switching frequency or duty ratio of the voltage applied to the primary coil 20 such that the optimum voltage of about 25 KV always appears along the high-tension line 5.

In the fifth example, the output voltage of the Gm electrode voltage source 17 and the screen bias voltage from the variable resistor 8 are input into the comparison circuit 19. In a case where, although the output voltage of the Gm electrode voltage source 17 is at a normal value, only the screen bias voltage falls from its normal value, the comparison circuit 19 determines that a discharge has occurred between any electrode within the electron gun and the anode or the cathode, and delivers a signal indicative of occurrence of the discharge. In response to this signal, the high-tension control circuit 22 reduces the effective value of the voltage applied to the primary coil 20 by controlling the switching frequency or duty ratio of this voltage. Thus, the voltage of the high-tension line 5 and the voltage applied to the G3 electrode 11 go down, and the discharge ceases. It is also possible to make a microcomputer (not shown) performing other functions of the display apparatus carry out the function of the comparison circuit 19.

Figure 6:
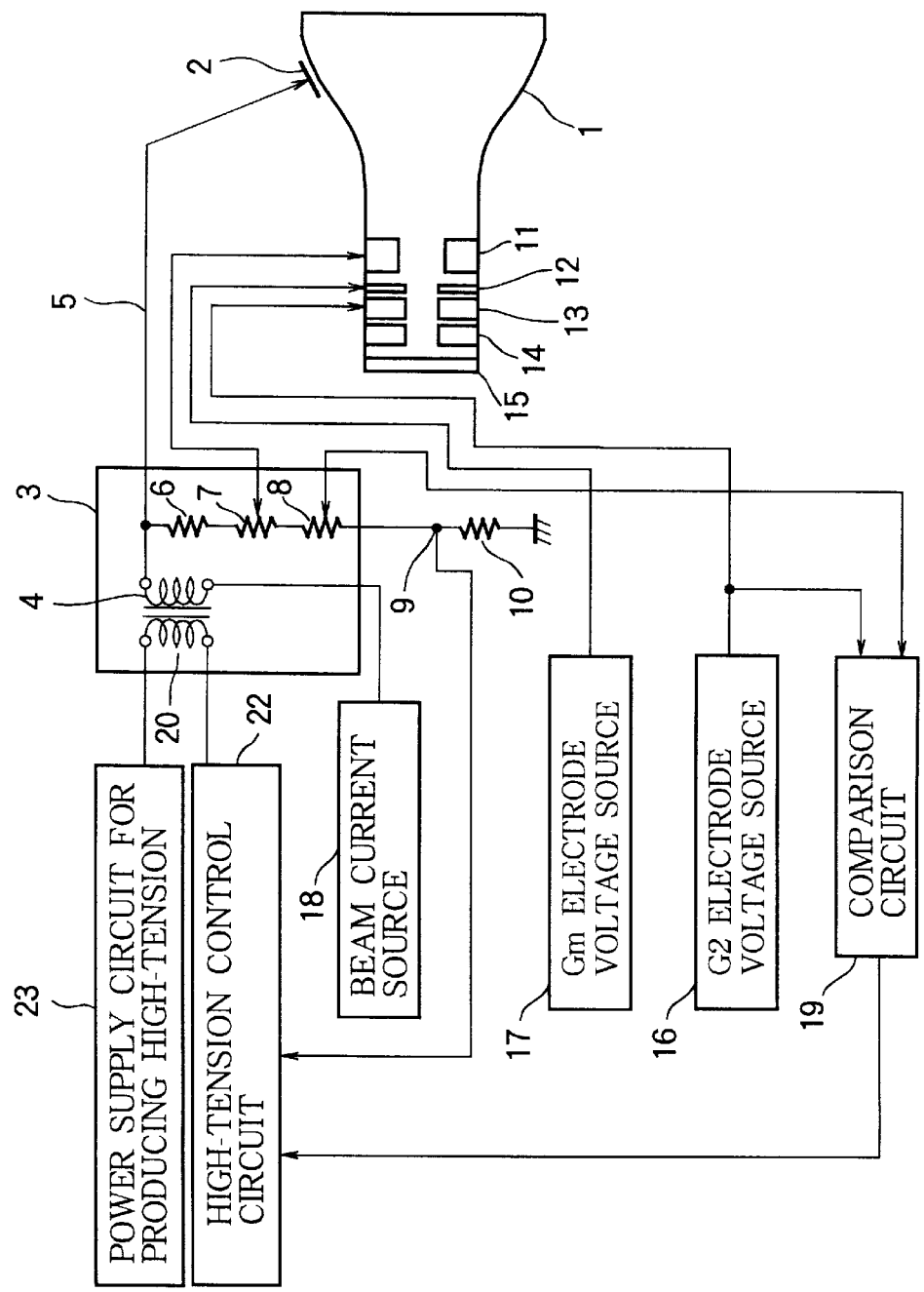
FIG. 6 is a block diagram showing a structure of a sixth example of the CRT display apparatus according to the invention.

FIG. 6 is a block diagram showing a structure of a sixth example of the CRT display apparatus according to the invention. In FIG. 6, the elements that are the same as those in FIG. 1 are given the same reference numerals, and explanation thereof will be omitted. The sixth example as well as the fifth example utilizes, for detecting occurrence of a discharge between any electrode within the electron gun and the anode or the cathode, the output of the variable resistor 8 which produces the screen bias voltage to be applied to the G2 electrode for adjusting the black level. However, it differs from the fifth example in that the comparison circuit 19 is supplied with the output voltage of the G2 electrode voltage source 16 instead of the output voltage of the Gm electrode voltage source 17.

In the sixth example, in a case where, although the output voltage of the G2 electrode voltage source 16 is at a normal value, only the screen bias voltage falls from its normal value, the comparison circuit 19 determines that a discharge has occurred between any electrode within the electron gun and the anode or the cathode, and delivers a signal indicative of occurrence of the discharge. In response to this signal, the high-tension control circuit 22 reduces the effective value of the voltage applied to the primary coil 20 by controlling the switching frequency or duty ratio of this voltage. Thus, the voltage of the high-tension line 5 and the voltage applied to the G3 electrode 11 go down, and the discharge ceases. It is also possible to make a microcomputer (not shown) performing other functions of the display apparatus carry out the function of the comparison circuit 19.

Figure 7:
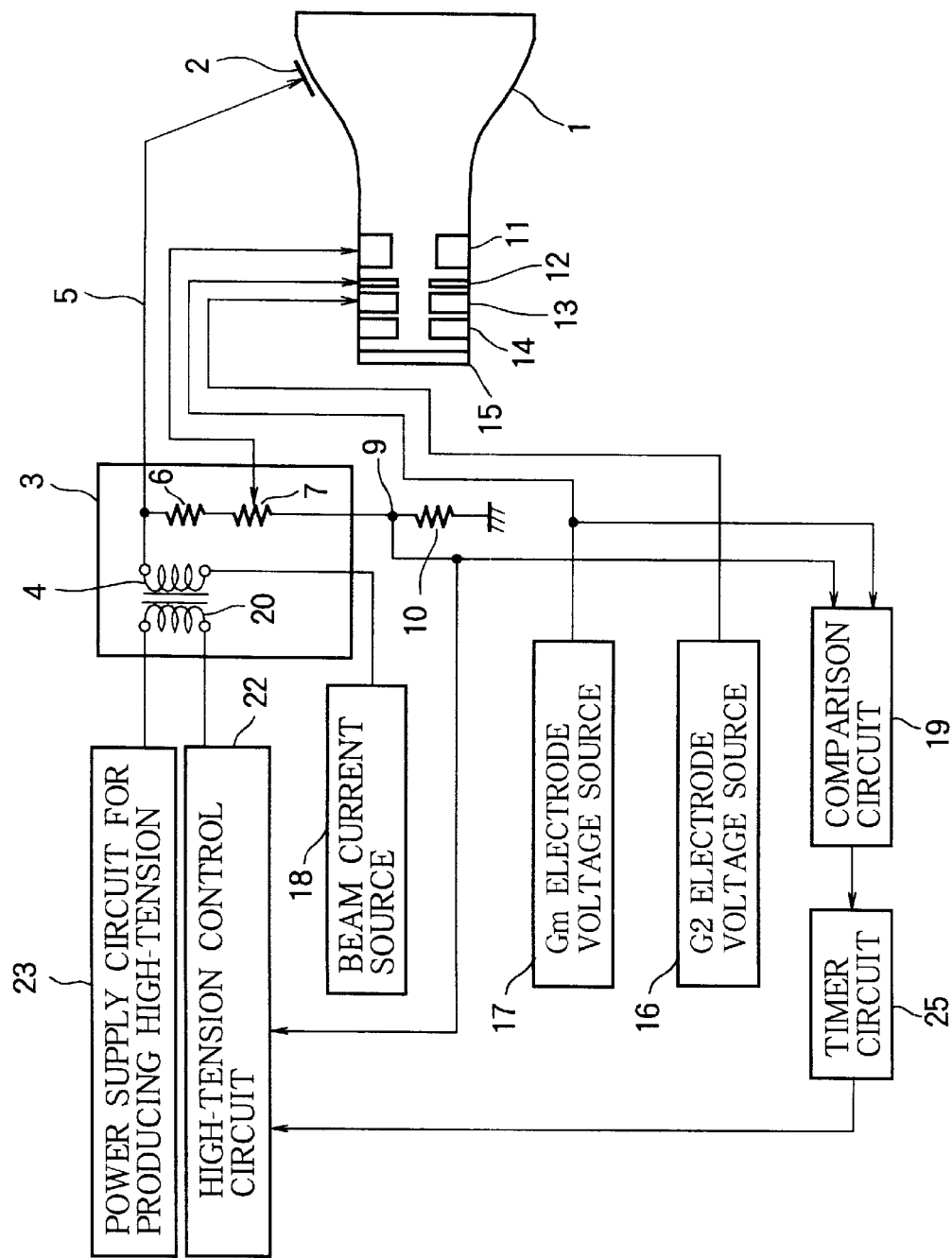
FIG. 7 is a block diagram showing a structure of a seventh example of the CRT display apparatus according to the invention.

FIG. 7 is a block diagram showing a structure of a seventh example of the CRT display apparatus according to the invention. In FIG. 7, the elements that are the same as those in FIG. 1 are given the same reference numerals, and explanation thereof will be omitted. The seventh example differs from the first example in that the output of the comparison circuit 19 is supplied to the high-tension control circuit 22 through a timer circuit 25.

In the seventh example as well as the first example, the voltage at the high-tension level feedback point 9 and the output voltage of the Gm electrode voltage source 17 are input into the comparison circuit 19. In a case where, although the output voltage of the Gm electrode voltage source 17 is at a normal value, only the voltage at the high-tension level feedback point 9 falls from its normal value, the comparison circuit 19 determines that a discharge has occurred between any electrode within the electron gun and the anode or the cathode, and delivers a signal indicative of occurrence of the discharge. This signal is input to the high-tension control circuit 22 through the timer circuit 25. In response to this signal, the high-tension control circuit 22 reduces the effective value of the voltage applied to the primary coil 20 by controlling the switching frequency or duty ratio of this voltage over a period of time preset in the timer circuit 25. When the period has elapsed, the high-tension control 22 ceases its control operation. Thus, the apparatus can automatically recover from the state in which the screen is blanked out. The period of time preset in the timer circuit 25 may be variable. It is possible to provide all the examples described above with the timer circuit 25. It is also possible to make a microcomputer (not shown) performing other functions of the display apparatus carry out the function of the comparison circuit 19.

The above explained preferred embodiments are exemplary of the invention of the present application which is described solely by the claims appended below. It should be understood that modifications of the preferred embodiments may be made as would occur to one of skill in the art.

What is claimed is:

1. A CRT display apparatus comprising:
a CRT having an electron gun;
said electron gun including:
a cathode;
a G1 electrode, a G2 electrode, and a G3 electrode disposed in that order for drawing electrons from said cathode; and
a modulating Gm electrode disposed between said G2 electrode and said G3 electrode,
a transformer producing a high tension to be applied to an anode of said CRT at a secondary coil thereof;
a voltage-dividing resistor dividing said high-tension to produce a voltage to be applied to said G3 electrode;
a voltage generator generating a voltage having a value depending on a current flowing into said dividing resistor as a feedback voltage;
a high-tension control circuit for controlling, on the basis of said feedback voltage, a voltage at a primary coil of said transformer so as to keep said high-tension at a predetermined value;
a G2 electrode voltage source for outputting a predetermined voltage to be applied to said G2 electrode;
a Gm electrode voltage source for outputting a predetermined voltage to be applied to said Gm electrode; and
a comparator for comparing said feedback voltage with one of an output voltage of said Gm electrode voltage source and an output voltage of said G2 electrode voltage source, said comparator supplying a detection signal to said high-tension control circuit upon detecting that only said feedback voltage has fallen from a normal value,
said high-tension control circuit controlling said voltage at said primary coil of said transformer so as to lower said high-tension in response to said detection signal.

2. A CRT display apparatus according to claim 1, in which said comparator is provided with a timer circuit to enable said high-tension control circuit to lower said high-tension over a predetermined period of time preset in said timer circuit, and thereafter return said high-tension to a normal value.

3. A CRT display apparatus comprising:
a CRT having an electron gun;
said electron gun including:
a cathode; and
a G1 electrode, a G2 electrode, and a G3 electrode disposed in that order for drawing electrons from said cathode,
a transformer producing a high tension to be applied to an anode of said CRT at a secondary coil thereof;
a voltage-dividing resistor dividing said high-tension to produce a voltage to be applied to said G3 electrode;
a voltage generator generating a voltage having a value depending on a current flowing into said dividing resistor as a feedback voltage;
a high-tension control circuit for controlling, on the basis of said feedback voltage, a voltage at a primary coil of said transformer so as to keep said high-tension at a predetermined value;
a G2 electrode voltage source for outputting a predetermined voltage to be applied to said G2 electrode; and
a comparator for comparing said feedback voltage with an output voltage of said G2 electrode voltage source, said comparator supplying a detection signal to said high-tension control circuit upon detecting that only said feedback voltage has fallen from a normal value,
said high-tension control circuit controlling said voltage at said primary coil of said transformer so as to lower said high-tension in response to said detection signal.

4. A CRT display apparatus according to claim 3, in which said comparator is provided with a timer circuit to enable said high-tension control circuit to lower said high-tension over a predetermined period of time preset in said timer circuit, and thereafter return said high-tension to a normal value.

5. A CRT display apparatus comprising:
a CRT having an electron gun;
said electron gun including:
a cathode;
a G1 electrode, a G2 electrode, and a G3 electrode disposed in that order for drawing electrons from said cathode; and
a modulating Gm electrode disposed between said G2 electrode and said G3 electrode,
a transformer producing a high tension to be applied to an anode of said CRT at a secondary coil thereof;
a voltage-dividing resistor dividing said high-tension to produce a voltage to be applied to said G3 electrode;
a first voltage generator generating a voltage having a value depending on a current flowing into said dividing resistor as a feedback voltage;
a high-tension control circuit for controlling, on the basis of said feedback voltage, a voltage at a primary coil of said transformer so as to keep said high-tension at a predetermined value;
a G2 electrode voltage source for outputting a predetermined voltage to be applied to said G2 electrode;
a Gm electrode voltage source for outputting a predetermined voltage to be applied to said Gm electrode;
a second voltage generator for outputting a voltage of a value equal to a value of said feedback voltage when said CRT display apparatus is operating normally; and
a comparator for comparing said feedback voltage with an output voltage of said second voltage generator, said comparator supplying a detection signal to said high-tension control circuit upon detecting that only said feedback voltage has fallen from a normal value,
said high-tension control circuit controlling said voltage at said primary coil of said transformer so as to lower said high-tension in response to said detection signal.

6. A CRT display apparatus according to claim 5, in which said comparator is provided with a timer circuit to enable said high-tension control circuit to lower said high-tension over a predetermined period of time preset in said timer circuit, and thereafter return said high-tension to a normal value.

7. A CRT display apparatus comprising:
a CRT having an electron gun,
said electron gun including:
a cathode;
a G1 electrode, a G2 electrode, and a G3 electrode disposed in that order for drawing electrons from said cathode; and
a modulating Gm electrode disposed between said G2 electrode and said G3 electrode,
a transformer producing a high tension to be applied to an anode of said CRT at a secondary coil thereof;

a first voltage-dividing resistor dividing said high-tension to produce a voltage to be applied to said G3 electrode;

a second voltage-dividing resistor connected in series to said first voltage-dividing resistor to produce a screen bias voltage used to adjust a black level of a screen of said CRT;

a voltage generator generating a voltage having a value depending on a current flowing into said first and second voltage-dividing resistors as a feedback voltage;

a high-tension control circuit for controlling, on the basis of said feedback voltage, a voltage at said primary coil of said transformer so as to keep said high-tension at a predetermined value;

a G2 electrode voltage source for outputting a predetermined voltage to be applied to said G2 electrode;

a Gm electrode voltage source for outputting a predetermined voltage to be applied to said Gm electrode; and a comparator for comparing said screen bias voltage with one of an output voltage of said Gm electrode voltage source and an output voltage of said G2 electrode voltage source, said comparator supplying a detection signal to said high-tension control circuit upon detecting that only said screen bias voltage has fallen from a normal value, said high-tension control circuit controlling said voltage at said primary coil of said transformer so as to lower said high-tension in response to said detection signal.

8. A CRT display apparatus according to claim 7, in which said comparator is provided with a timer circuit to enable said high-tension control circuit to lower said high-tension over a predetermined period of time preset in said timer circuit, and thereafter return said high-tension to a normal value.

* * * * *